(12) United States Patent
Böhnke et al.

(10) Patent No.: US 7,145,955 B1
(45) Date of Patent: Dec. 5, 2006

(54) OPTIMIZED SYNCHRONIZATION PREAMBLE STRUCTURE

(75) Inventors: Ralf Böhnke, Esslingen (DE); Thomas Dölle, Stuttgart (DE); Tino Konschak, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 09/556,693

(22) Filed: Apr. 21, 2000

(30) Foreign Application Priority Data

Apr. 23, 1999 (EP) .................................. 99108083

(51) Int. Cl.
*H04L 27/28* (2006.01)
(52) U.S. Cl. ...................................... 375/260; 375/343
(58) Field of Classification Search ................ 375/354, 375/260, 362, 363, 146, 147, 343, 259; 370/203, 370/210
See application file for complete search history.

(56) References Cited

U.S. PATENT DOCUMENTS 6,549,592 B1 * 4/2003 Jones .......................... 375/354

FOREIGN PATENT DOCUMENTS

EP 0 915 597 5/1999

OTHER PUBLICATIONS

Mizoguchi, et al. A Fast Burst Synchronziation Scheme for OFDM. Oct. 1998, IEEE, International Conference on Universal Persona Communications, vol. 1, p. 125-29.*
Schmidl T M et al: "Low-Overhead, Low-Complexity Burst Synchronization for OFDM" 1996 IEEE International Conference on Communications, Converging Technologies for Tomorrow's Applications Dallas, 1996, vol. 3, Jun. 23, 1996, pp. 1301-1306, XP000625022.
Keller T et al "Orthogonal Frequency Division Multiplex Synchronisation Techniques for Wireless Local Area Networks" IEEE International Symposium on Personal, Indoor and Mobile Radio Communications, vol. 3, Oct. 15, 1996, pp. 963-967, XP002063294.
Fetchel S A et al: "Fast Frame Synchronization Frequency, Offset Estimation and Channel Acquisition for Spontaneous Transmission Over Unknown Frequency-Selective Radio Channels" Communications, PIMRC'93, 1993, pp. 229-233, XP002116291.

* cited by examiner

*Primary Examiner*—Jay K. Patel
*Assistant Examiner*—David B. Lugo
(74) *Attorney, Agent, or Firm*—Oblon, Spivak, McClelland, Maier & Neustadt, P.C.

(57) ABSTRACT

Orthogonal Frequency Division Multiplexed transmission and reception using a broadcast burst preamble. The preamble comprises at least one first part (A-FIELD) designed for a coarse frame detection and/or an AGC control, and at least one second part (B-FIELD) following the at least one first part in the time domain and being designed for a timing and frequency synchronization. The at least one first part (A-FIELD) and the at least one second part (B-FIELD) each include Inverse Fast Fourier Transformed (IFFT) frequency domain sequences of complex symbols. The frequency domain sequence of the at least one first part (A-FIELD) is set depending on the frequency domain sequence of the at least one second part (B-FIELD) such that a second auto-correlation peak mainly generated by the at least one second part (B-FIELD) of the preamble is optimized. The sequence of complex symbols of the first part differs from the sequence of complex symbols of the second part in at least one symbol.

8 Claims, 4 Drawing Sheets

OPTIMIZED SYNCHRONIZATION PREAMBLE STRUCTURE

BACKGROUND OF THE INVENTION (1) Field of the Invention

The present invention relates to a synchronization preamble structure for the synchronization of a receiver of a OFDM transmission. The invention furthermore relates to an OFDM transmitter as well as to a method for the synchronization of a receiver of an OFDM transmission system.

(2) Description of Related Art

A synchronization preamble structure as shown in FIG. 1 is known. This known synchronization preamble structure can be subdivided in a A-FIELD, B-FIELD and a C-FIELD. The A-FIELD and the B-FIELD are subdivided in further parts. Each of the A-FIELD and the B-FIELD and the C-FIELD is designed to have an optimized special synchronization function at the receiving side. The A-FIELD for example serves for a coarse frame detection and an automatic gain control (AGC). The B-FIELD serves as a coarse frequency offset and timing synchronization. The C-FIELD serves for a channel estimation and fine synchronization.

Details about the concrete structure and generation of the B-FIELD can be found in the European patent application 99 103 379.6 in the name of Sony International (Europe) GmbH, which is to be regarded as representing prior art according to article 54(3) EPC. Regarding the details of the B-FIELD and generally the generation of the time domain synchronization preamble signal as shown in FIG. 1 reference is made to said prior non-prepublished application.

The symbols of the C-FIELD, which is generally of minor interest for the present invention, are defined in frequency domain as $$C64_{-26\ldots 26}=\{1,1,-1,-1,1,1,-1,1,-1,1,1,1,1,1,1,-1,-\\1,1,1,-1,1,-1,1,1,1,1,0,1,-1,-1,1,1,-1,1,-1,1,-\\1,-1,-1,-1,-1,1,1,-1,-1,1,1,-1,1,-1,1,1,1,1,1\}$$

The symbols B16 of the B-FIELD are short OFDM symbols, of which the subcarriers +-4, +-8, +-12, +-16, +-20, +-24 are modulated. The content in the frequency domain is equal to the one proposed in the above-cited EP-99 103 379.6. It can be defined as $$B_{-26\ldots 26}=\mathrm{sqrt}(2)^*\{0,0,1+j,0,0,0,-1+j,0,0,0,-1-j,0,0,\\0,-1-j,0,0,0,-1-j,0,0,0,1-j,0,0,0,\,0,0,0,0,1-j,0,0,0,\\0,1-j,0,0,0,-1j,0,0,0,-1j,0,0,0,1+j,0,0,0,1+j,0,0\}$$

The last repetition of the B-FIELD and the time domain, which is called IB16, is a sign inverted copy of the preceding B16. Note that the symbol sequence mapped onto subcarriers to generate B16 has particularly advantages for a low PAPR (peak-to-average-power-ratio) and small dynamic range.

According to the known concept as shown in FIG. 1 the symbols A16 of the A-FIELD are short OFDM symbols, of which the subcarriers +-2, +-6, +-10, +-14, +-18, +-22 are modulated (for a 64 point IDFT or IFFT). The content in the frequency domain can be defined as $$A16_{26\ldots 26}=\mathrm{sqrt}(2)^*\{0,0,0,0,\,+1+j,0,0,0,-1+j,0,0,0,-\\1-j,0,0,0,\,+1-j,0,0,0,\,+1+j,0,0,0,\,+1-j,0,0,0,\\+1+j,0,0,0,\,+1-j,0,0,0,\,+1+j,0,0,0,\,+1-j,0,0,0,-\\1-j,0,0,0,-1+j,0,0,0,0\}$$

The sign reversal of every second A16 symbol in the time domain is automatically achieved by the specified subcarrier loading. The last repetition of the A-FIELD in time domain, which is called IA16, is a copy of the preceding RA16.

SUMMARY OF THE INVENTION

It is the object of the present invention to provide for a technique departing from the above-shown proposal which allows for better autocorrelation properties on a receiving side of a OFDM system.

This object is achieved by means of the features of the independent claims. The dependent claims develop further the central idea of the present invention.

According to the present invention therefore a synchronization preamble structure for the synchronization of a receiver of a OFDM transmission is proposed. The synchronization structure thereby comprises at least one first and one second part. At least one first part thereby is designed for a coarse frame detection and/or an AGC control. At least one second part following the at least one first part in the time domain is designed for a timing and frequency synchronization. The at least one first part and the at least one second part contain Inverse Fast Fourier transformed frequency domain sequences of complex symbols.

The sequence of the at least one first part is set depending on the sequence of the at least one second part of the synchronization preamble structure such that the synchronization performance is optimized. Therefore, according to the present invention for the first time it has been seen that by changing the sequence of the first part of the synchronization preamble structure can effect in a positive way the second part of the synchronization preamble structure. With other words, the present invention shows that for example the quality of the autocorrelation peak generated mainly by the sequence of the at least one second part of the synchronization preamble structure can be improved by optimizing this sequence of the at least one first part of the synchronization preamble structure.

The design principle is to set the frequency domain content of the A-FIELD such that the resulting time domain waveform (with respect to the B-FIELD time domain waveform) results in improved synchronization properties. Note that different synchronization techniques such as auto-correlation or cross-correlation can be used on the receiver side.

The frequency domain sequence of the at least one first part can be set depending on the frequency domain sequence of the at least one second part such that a second correlation peak mainly generated by the at least one second part is optimized. The expression "mainly generated" has been used to take into account that the sequence of the at least one first part of the synchronization preamble structure has some influence on the second correlation peak.

The time domain signal of the synchronization preamble can be generated by mapping frequency domain sequences of 12 complex symbols to a 64 point Inverse Fast Fourier Transformation (IFFT). Thereby the remaining inputs of the IFFT are set to 0. The last six complex symbols of the sequence of the at least one first part thereby can be identical with the last six complex symbols of the sequence of the at least one second part.

Additionally or alternatively, the first six complex symbols of the sequence of the at least one first part of the synchronization preamble structure can be respectively different to the first six complex symbols of the sequence of the at least one second part of the synchronization preamble structure.

The frequency domain sequence of the at least one first part can be $$S_A=(1+i),\,(-1+i),\,(-1,\,-i),\,(1-i),\,(-1-i),\,(1-i),\,(-1-i),\,(-1-i),\,(-1-i),\,(-1-i),\,(-1+i),\,(1+i),$$

In this case the frequency domain sequence of the at least one second part is $S_B$=(1+i), (−1+i), (−1, −i), (1−i), (−1−i), (1−i), (−1−i), (−1−i), (−1−i), (−1+i), (1+i).

According to the present invention furthermore an OFDM transmitter designed for the transmission of a synchronization preamble as set forth above in the BCCH channel of a OFDM system is provided.

As a further aspect of the present invention a method for the synchronization of a receiver of a OFDM transmission system is provided. Thereby the synchronization structure comprises at least two parts. At least one first part is thereby designed for a coarse frame detection and/or an AGC control. At least one second part following the at least one first part in the time domain is designed for a timing and frequency synchronization. The at least one first part and the at least one second part contain Inverse Fast Fourier (IFFT) transformed frequency domain sequences of complex symbols.

The sequence of the at least one first part of the synchronization preamble structure therefore is such that the synchronization performance is optimized depending on the sequence of the at least one second part.

In the following preferred embodiments of the present invention will be explained with reference to the enclosed figures of the drawing such that further objects, advantages and features of the present invention will come clearer.

DETAILED DESCRIPTION OF THE INVENTION

Figure 1:
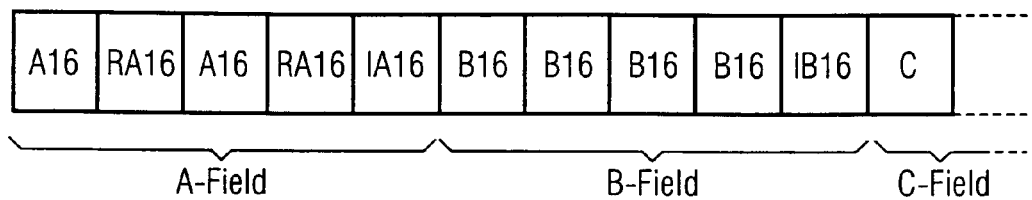
FIG. 1 shows the structure of a synchronization preamble structure.

FIG. 1 showing the general structure of a synchronization preamble structure has already been explained in the introductory portion of the description. Said general structure is not changed according to the present invention. However, according to the present invention the A-FIELD sequence is modified giving advantages for the autocorrelation properties. In case the B-FIELD sequence is fixed, the A-FIELD sequence is optimized and set depending from the fixed B-FIELD sequence such that the autocorrelation peaks generated by the A- and B-FIELD sequence are improved.

The design principle is to set the frequency domain content of the A-FIELD such that the resulting time domain waveform (with respect to the B-FIELD time domain waveform) results in improved synchronization properties.

Note that other synchronization techniques such as cross-correlation can be used on the receiver side.

Note that it is beneficial that the length of the A-FIELD and the B-FIELD is equal (same number of short symbols).

Particularly the A-FIELD sequence is changed such that the B-FIELD autocorrelation peak presents less plateaus and side lobes. With other words, according to the present invention it has been shown for the first time that by optimizing the A-FIELD sequence, the B-FIELD autocorrelation peak can be optimized.

For the A-FIELD sequence the present invention suggests a technique to improve the sequence, which gives the advantages as described further on.

Generally it can be said that the last six complex symbols of the sequence of the A-FIELD can be identical with the last six complex symbols of the sequence of the B-FIELD The first six complex symbols of the sequence of the A-FIELD can be respectively different to the first six complex symbols of the sequence of the B-FIELD.

The symbols A16 of the A-FIELD sequence according to the present invention in the time domain are short OFDM symbols (meaning that the time domain shows a periodicity), wherein the subcarriers +−2, +−6, +−10, +−14, +−18, +−22 are modulated. The frequency domain content of the A-FIELD sequence using the sequence according to the present invention can be defined as $A16_{−26 \ldots 26}$=sqrt(2)*{0,0,0,0,+1−j,0,0,0,+1+j,0,0,0,−1+j,0,0,0,−1 −j,0,0,0,+1−j,0,0,0,−1−j,0,0,0,+1−j, 0,0,0,−1−j,0,0,0, +1−j,0,0,0,−1−j,0,0,0,−1+j,0,0, 0, +1+j,0,0,0,0}

The short OFDM symbols consisting of 12 modulated subcarriers are phase modulated by the elements of the symbol alphabet S=√2(±1±j). The C-FIELD symbols are not further considered here.

The full sequence for the field A is:

$S_{−26,26}$=sqrt(2)*{0,0,0,0,S1,0,0,0,S2,0,0,0,S3,0,0,0,S4, 0,0,0,S5,0,0,0,S6,0,0,0,S7,0,0,0,S8,0,0,0,S9,0,0,0, S10,0,0,0,S11,0,0,0,S12,0,0,0,0}*(−1)

Thereby √2 is used by normalizing the power. Applying a 64-point IFFT to the vector S, wherein the remaining 15 values are set to 0, four short training symbols can be generated. The IFFT output is cyclically extended to result in the dedicated number of short symbols.

The A-FIELD sequence according to the prior art is:

S1 . . . 12=(1+j), (−1+j), (−1−j), (1−j), (1+j), (1−j), (1+j), (1−j), (1+j), (−1−j), (1+j), (1−j) (−1−j), (−1+j)

One example for an A-FIELD sequence according to the present invention is:

S1 . . . 12=(1−j), (1+j), (−1+j), (−1−j), (−1−j), (1−j), (1−j), (−1−j), (1−j), (−1−j), (1+j), (1+j)

Thereby the full sequence for the field B is:

$S_{−26,26}$=sqrt(2)*{0,0,S1,0,0,0,S2,0,0,0,S3,0,0,0,S4,0,0, 0,S5,0,0,0,S6,0,0,0,0,0,0,0,S7,0,0,0, S8,0,0,0,S9, 0,0,0,S10,0,0,0,S11,0,0,0,S12,0,0}

Thereby √2 is used to normalize the power. Applying a 64-point IFFT to the vector S, wherein the remaining 15 values are set to 0, four short training symbols can be generated. The IFFT output is cyclically extended to result in the dedicated number of short symbols.

The sequence for the field B thereby is:

S1 ... 12=(1+j), (−1+j), (−1−j), (1−j), (−1−j), (1−j),
(1−j), (−1−j), (1−j), (−1−j), (−1+j), (1+j)

Figure 2:
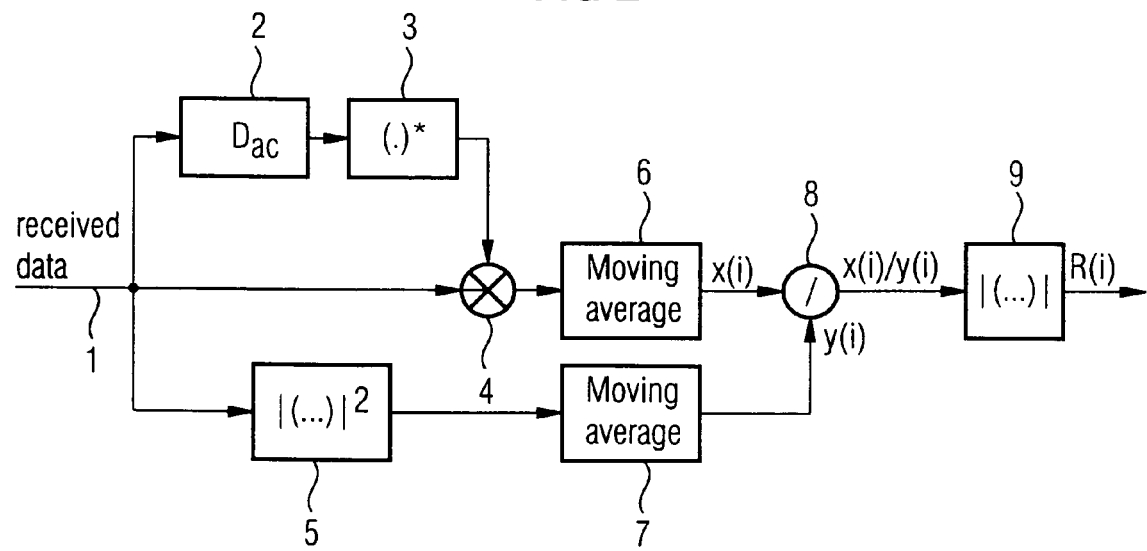
FIG. 2 shows an autocorrelation dock diagram.

With reference to FIG. 2 now an autocorrelation technique on the receiving side of an OFDM system will be explained. The received signal 1 is delayed by a delaying unit 2 by the correlation delay Dac. The conjugate complex samples of the delayed version of the signals are generated 3 and multiplied 4 with the received samples. The products are set into the moving average unit 6 with a window size Wac and are then postprocessed for a threshold detection and/or maximum search (units 5, 7, 8) to find the correct timing. The complex correlation result at the peak possession generated by the unit 9 can be used to estimate the frequency offset.

Figure 3:
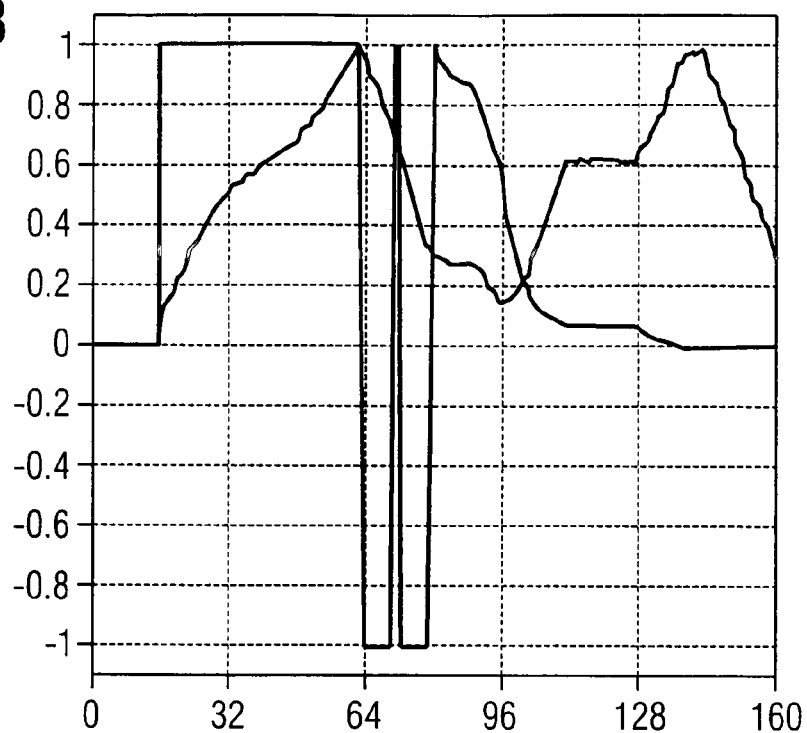
FIG. 3 shows an ideal autocorrelation result when using the A-FIELD sequence according to the prior art.

With reference to FIGS. 3 to 7 now simulation results will be explained to show the performance of the proposed technique. FIG. 3 thereby shows the ideal autocorrelation result (amplitude and phase) of a BCCH preamble according to the prior art. The autocorrelation result is used to identify a frame start, adjust the AGC and to effect timing and frequency synchronization. Particularly the B-FIELD can be used for the later synchronization tasks (timing and frequency synchronization). It is very important to achieve timing synchronization as exactly as possible as can be seen from FIG. 3 according to the prior art the BCCH structure presents a plateau which can be identified before the autocorrelation amplitude peak in field B. This "plateau" effect decreases the timing accuracy significantly. Apart from the plateau the peak itself does not present a good and well-shaped quality.

Figure 4:
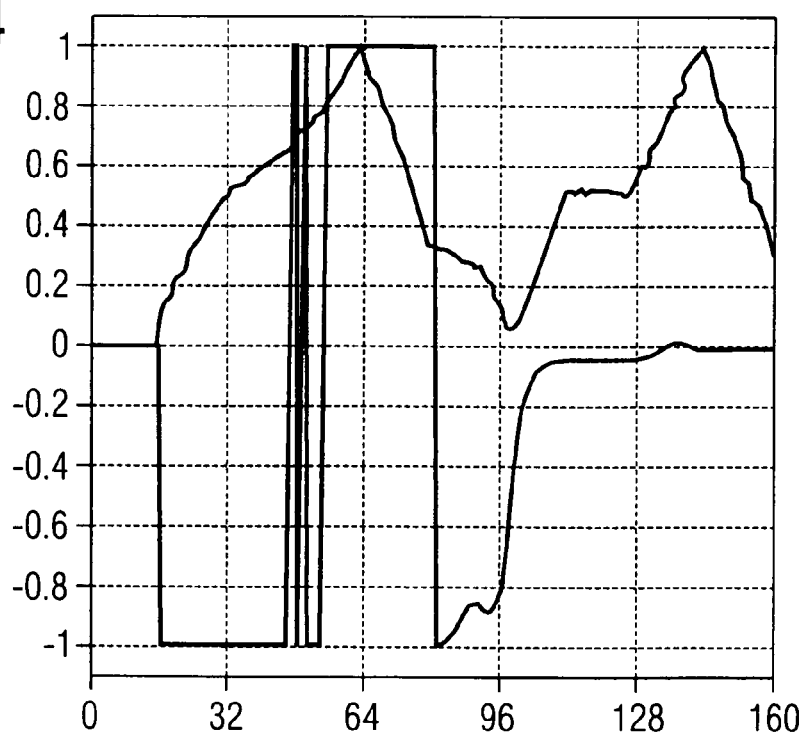
FIG. 4 shows the ideal autocorrelation result when using the A-FIELD sequence according to the present invention.

FIG. 4 shows the autocorrelation performance of the BCCH preamble according to the present invention. The above described plateau and side loupe effect encountered by using the prior art proposal, can be avoided if the A-FIELD sequence according to the present invention is used. An optimized matching between A- and B-FIELD of the BCCH preamble is achieved and thus the timing accuracy can be improved, which is basically achieved through the specified time domain structure. In FIG. 4 two clear single autocorrelation amplitude peaks can be identified in the BCCH preamble, if the sequence according to the present invention art is used for the generation of the A-FIELD.

In the following the time domain signal properties will be explained with reference to FIGS. 5 to 7.

For OFDM (or in general multicarrier signals) the signal envelope fluctuation (called peak-two-average-power-ratio=PAPR) is of great concern. A large PAPR results in poor transmission (due to non linear distortion effects of the power amplifier) and signal limiting components in the transmission system (e.g. limited dynamic range of the A/B converter).

For synchronization sequences it is even more desirable to have signals with the low PAPR and low dynamic range in order to accelerate the receiver AGC (automatic gain control) locking and adjusting the reference signal value for the A/B converter (the hole dynamic range of the incoming signal should be covered by the A/B converter resolution without any overflow/underflow.

Figure 6:
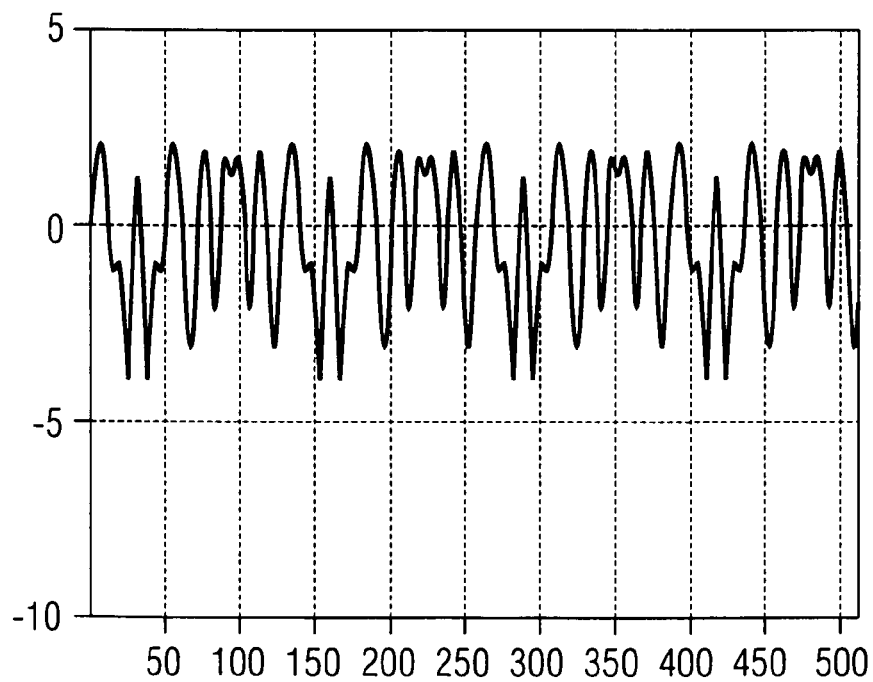
FIG. 6 shows the time domain signal (power) of the A-FIELD sequence according to the prior art in case of an 8-times oversampling.

FIG. 6 shows the time domain power envelope of the resulting time domain signal wave form when using the A-FIELD sequence according to the prior art, in dB. 8-times oversampling was considered in order to ensure that the peaks were captured correctly using the limited 64-point IFFT. The resulting PAPR is 2.13 dB and the dynamic range is 6.13 dB (with 8-times oversampling).

Figure 5:
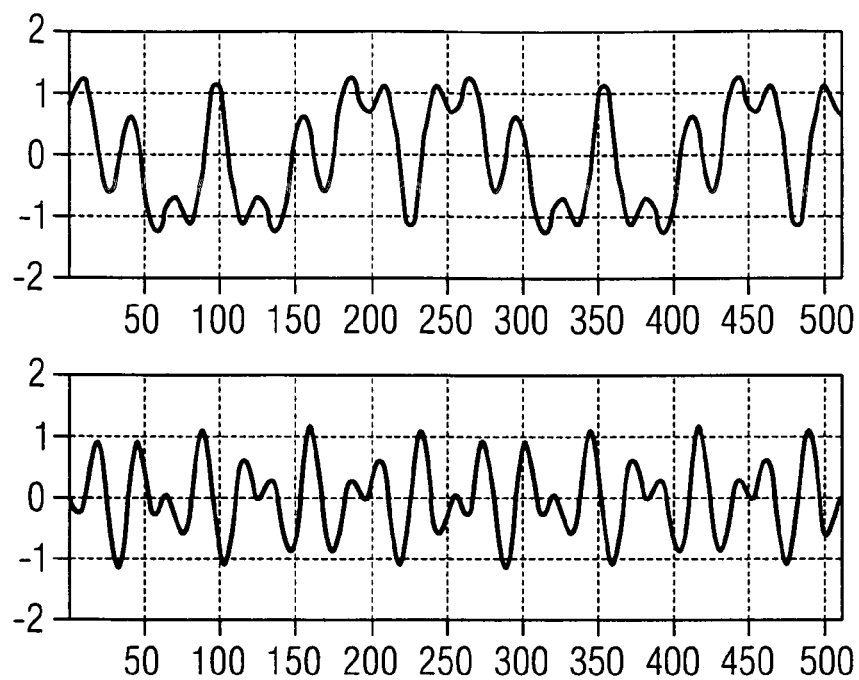
FIG. 5 shows the time domain signal (In and Quad part) of the A-FIELD sequence according to the prior art in case of an 8-times oversampling.

FIG. 5 shows the real and imaginary part of the resulting transmitted time domain wave form.

Figure 8:
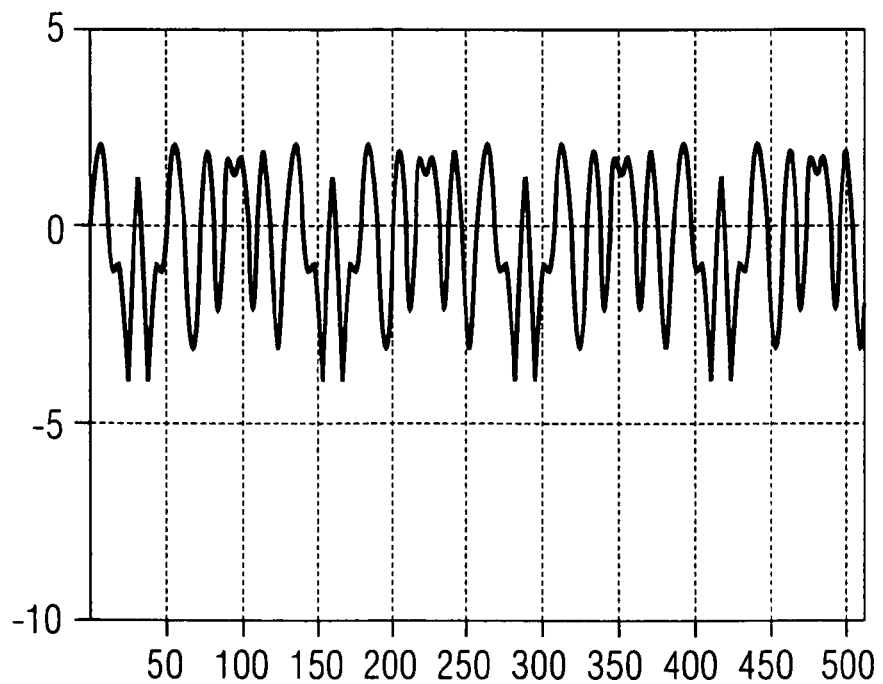
FIG. 8 shows the time domain signal (power) when using the A-FIELD sequence according to the present invention in case of an 8-times oversampling.

FIG. 8 shows the time domain power envelope of the resulting time domain signal wave form when using the proposed sequence according to the present invention. 8-times oversampling was considered in order to ensure that the peaks were captured correctly using the limited 64-point IFFT. The resulting PAPR is 2.13 dB and the dynamic range is 6.13 dB. The PAPR and the dynamic range therefore are not degraded when using the sequences according to the present invention in comparison to the prior art.

Figure 7:
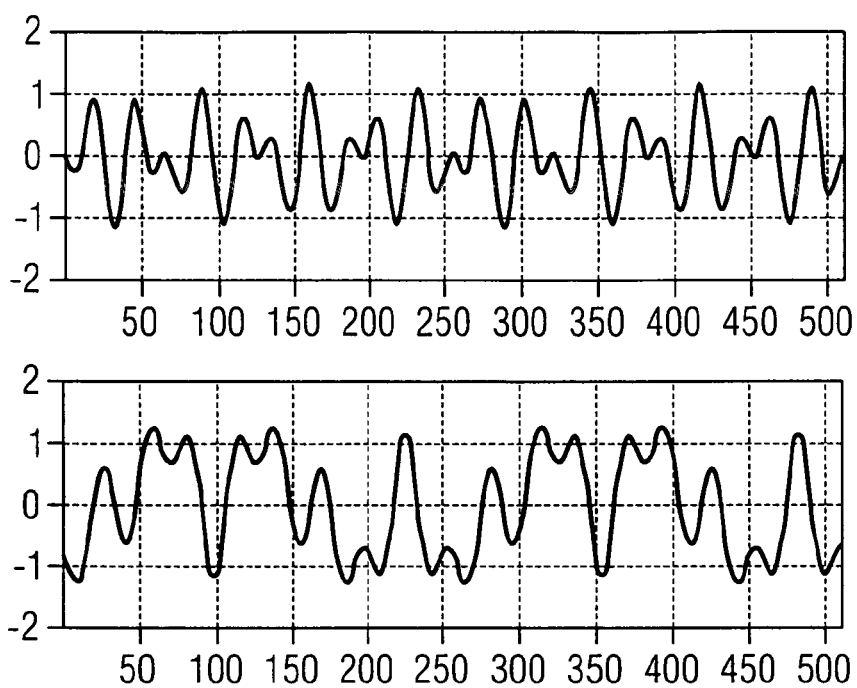
FIG. 7 shows the time domain signal (In and Quad part) of the A-FIELD sequence according to the present invention in case of an 8-times oversampling.

FIG. 7 shows a real and imaginary part of the resulting transmitted time domain wave form.

The invention proposes a technique for an optimized synchronization (synch) symbol sequence to be used in OFDM transmission systems. The synchronization symbol structure is constructed using specially designed OFDM symbols with an optimized sequence, which is mapped onto the modulated subcarriers. The resulting synchronization symbols consists of several repetitions in the time domain. Using the proposed sequence the resulting synchronization symbol provides a high-timing detection and frequency detection of said estimation accuracy. Furthermore, the burst is optimized to achieve a very low envelope fluctuation and a very low dynamic range to reduce complexity on the receiver and to increase the frequency and time dertection performance. The proposed A-FIELD sequence is particularly optimized with respect to all other synchronization symbols.

The invention is based on the synchronization and training preambles. The optimizes sequence is very suitable to generate a preamble or a part (also called field) of it by mapping the sequence to the appropriate subcarriers of a OFDM symbol with a IFFT size of 64. The benefit of the invention is the improved timing accuracy when the autocorrelation result in the B-FIELD is used for synchronization. The time domain structures of the preambles according to the prior art are not changed according to the invention.

The advantages of the present invention can be summarized as follows:

The invention proposes an OFDM based synchronization symbol with a low peak-to-average-power-ratio and small dynamic range, the synchronization performance (timing accuracy compared to current preambles) is improved, the specified time domain preamble structures according to the prior art are not modified, and no extra complexity is needed.

The invention claimed is:

1. A method of generating and transmitting a preamble signal in an OFDM (Orthogonal Frequency Division Multiplexing) system, comprising the steps of:

generating said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

generating a time domain signal from said preamble signal by performing an inverse fast Fourier transform (IFFT) on said frequency domain sequences; and transmitting said time domain signal from a transmitter-side to a receiver side of said OFDM system;

wherein said 12 complex symbols in the frequency domain sequences of said first and second parts are set so that a synchronization performed in the receiver side includes correlating said frequency domain sequence of said first part and said frequency domain sequence of said second part, and a last six symbols of the first part are each identical to each of respective last six symbols of the second part.

2. A device for generating and transmitting a preamble signal in an OFDM (Orthogonal Frequency Division Multiplexing) system, comprising:

a preamble signal generator configured to generate said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

a time domain signal generator configured to generate a time domain signal from said preamble signal by performing an inverse fast Fourier transform (IFFT) on said frequency domain sequences; and a transmitter configured to transmit said time domain signal from a transmitter side to a receiver side of said OFDM system;

wherein said 12 complex symbols in the frequency domain sequences of said first and second parts are set so that a synchronization performed in the receiver side includes correlating said frequency domain sequence of said first part and said frequency domain sequence of said second part, and a last six symbols of the first part are each identical to each of respective last six symbols of the second part.

3. A method of generating and transmitting a preamble signal in an OFDM (Orthogonal Frequency Division Multiplexing) system, comprising the steps of:

generating said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

generating a time domain signal from said preamble signal by performing an inverse fast Fourier transform (IFFT) on said frequency domain sequences; and transmitting said time domain signal from a transmitter side to a receiver side of said OFDM system;

wherein said 12 complex symbols in the frequency domain sequence of said first part correlates to said 12 complex symbols in the frequency domain sequence of said second part so that a correlation peak is generated by said timing and frequency synchronization performed in said transmitter side with said second part, and a last six symbols of the first part are each identical to each of respective last six symbols of the second part.

4. A device for generating and transmitting a preamble signal in an OFDM (Orthogonal Frequency Division Multiplexing) system, comprising:

a preamble signal generator configured to generate said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

a time domain signal generator configured to generate a time domain signal from said preamble signal by performing an inverse fast Fourier transform (IFFT) on said frequency domain sequences; and a transmitter configured to transmit said time domain signal from a transmitter side to a receiver side of said OFDM system;

wherein said 12 complex symbols in the frequency domain sequence of said first part correlates to said 12 complex symbols in the frequency domain sequence of said second part so that a correlation peak is generated by said timing and frequency synchronization performed in said transmitter side with said second part, and a last six symbols of the first part are each identical to each of respective last six symbols of the second part.

5. A method of generating and transmitting a preamble signal in an OFDM (Orthogonal Frequency Division Multiplexing) system, comprising the steps of:

generating said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

generating a time domain signal from said preamble signal by performing an inverse fast Fourier transform (IFFT) on said frequency domain sequences; and transmitting said time domain signal from a transmitter side to a receiver side of said OFDM system;

wherein said 12 complex symbols in said frequency domain sequences of the first and second parts have correlation properties set for said timing and frequency synchronization process performed in said receiver side, and a last six symbols of the first part are each identical to each of respective last six symbols of the second part.

6. A device for generating and transmitting a preamble signal in an OFDM (Orthogonal Frequency Division Multiplexing) system, comprising:

preamble signal generator configured to generate said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

time domain signal generator configured to generate a time domain signal from said preamble signal by performing an inverse fast Fourier transform (IFFT) on said frequency domain sequences; and a transmitter configured to transmit said time domain signal from a transmitter side to a receiver side of said OFDM system;

wherein said 12 complex symbols in said frequency domain sequences of the first and second parts have correlation properties set for said timing and frequency synchronization process performed in said receiver side, and a last six symbols of the first part are each identical to each of respective last six symbols of the second part.

7. A method of generating and transmitting a preamble signal in an OFDM (Orthogonal Frequency Division Multiplexing) system, comprising the steps of:

generating said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

generating a time domain signal from said preamble signal by performing an inverse fast Fourier transform (IFFT) on said frequency domain sequences; and transmitting said time domain signal from a transmitter side to a receiver side of said OFDM system;

wherein said 12 complex symbols in the frequency domain sequence of said first part are correlated with said 12 complex symbols in the frequency domain sequence of said second part for said timing and frequency synchronization process performed in said receiver side, and a last six symbols of the first part are each identical to each of respective last six symbols of the second part.

8. A device for generating and transmitting a preamble signal in an OFDM (Orthogonal Frequency Division Multiplexing) system, comprising:

preamble signal generator configured to generate said preamble signal comprising at least a first part, a second part following said first part in the time domain, and a third part following said second part in the time domain, wherein said first part is designed for a frame detection and/or an AGC (automatic gain control), said second part is designed for a coarse timing and frequency synchronization, and said third part is designed for fine synchronization, and wherein each of said first and second parts contains a frequency domain sequence comprising 12 complex symbols mapped on every four subcarriers of all available 52 subcarriers of said ODFM system, and said third part contains 52 symbols, each set to 1 or −1, mapped on said all available 52 subcarriers;

time domain signal generator configured to generate a time domain signal from said preamble signal by performing an inverse fast Fourier transform (IFFT) on said frequency domain sequences; and a transmitter configured to transmit said time domain signal from a transmitter side to a receiver side of said OFDM system;

wherein said 12 complex symbols in the frequency domain sequence of said first part are correlated with said 12 complex symbols in the frequency domain sequence of said second part for said timing and frequency synchronization process performed in said receiver side, and a last six symbols of the first part are each identical to each of respective last six symbols of the second part.

* * * * *